(12) United States Patent
Brusoe

(10) Patent No.: US 7,930,154 B2
(45) Date of Patent: Apr. 19, 2011

(54) FLUID SOLID INTERACTION INCLUDED IN IMPACT SIMULATION OF FUEL DELIVERY MODULE

(75) Inventor: Michael Brusoe, Belleville, MI (US)

(73) Assignee: Continental Automotive Systems US, Inc., Auburn Hills ( * ) Notice: Subject to any disclaimer, the term of this patent is extended or adjusted under 35 U.S.C. 154(b) by 538 days.

(21) Appl. No.: 12/010,737

(22) Filed: Jan. 29, 2008

(65) Prior Publication Data

US 2008/0189068 A1 Aug. 7, 2008

Related U.S. Application Data

(60) Provisional application No. 60/898,925, filed on Feb. 1, 2007.

(51) Int. Cl.
*G06F 9/455* (2006.01)
(52) U.S. Cl. .......................................................... 703/7
(58) Field of Classification Search .................. 703/7, 2, 703/6, 9, 22; 137/565.17, 590, 509; 73/669, 73/305; 345/646, 427; 188/374; 382/285; 123/509
See application file for complete search history.

(56) References Cited

U.S. PATENT DOCUMENTS

| | | | | |
|---|---|---|---|---|
| 4,945,884 A * | 8/1990 | Coha et al. | ..................... | 123/509 |
| 4,972,875 A * | 11/1990 | Beer et al. | ..................... | 137/590 |
| 6,367,325 B1 * | 4/2002 | Schellenberg | ................. | 73/305 |
| 7,146,859 B2 * | 12/2006 | Dittmann et al. | ............... | 73/669 |
| 7,590,514 B1 * | 9/2009 | Olovsson | ......................... | 703/6 |
| 2003/0058259 A1 * | 3/2003 | Kawaguchi et al. | .......... | 345/646 |
| 2003/0101971 A1 | 6/2003 | Farrar et al. | | |
| 2003/0200074 A1 * | 10/2003 | Cooper et al. | ................... | 703/22 |
| 2004/0011615 A1 * | 1/2004 | Ray et al. | ....................... | 188/374 |
| 2004/0172224 A1 * | 9/2004 | Sadagopan et al. | ............... | 703/2 |
| 2005/0027497 A1 | 2/2005 | Kretzschmar et al. | | |
| 2005/0183779 A1 * | 8/2005 | Horvath et al. | .......... | 137/565.17 |

(Continued)

FOREIGN PATENT DOCUMENTS

DE 19924207 A1 11/2000

(Continued)

OTHER PUBLICATIONS

English translation of DE19924207A1, Nov. 2000.*

(Continued)

*Primary Examiner* — Kandasamy Thangavelu

(57) ABSTRACT

A method is provided for simulating a vehicle crash on a fuel delivery module of a vehicle. The fuel delivery module (11) has a flange (10) constructed and arranged to be coupled to a fuel tank, a fuel pump (12) for delivering fuel from the tank and through the flange, a reservoir (18) housing the fuel pump, and strut rods (14). Each strut rod has an end coupled to the reservoir or fuel pump and another end coupled to the flange at an interface. The method models a fuel tank associated with the fuel delivery module as a rigid or elastic shell. A solid model of the fuel delivery module is created. The solid model is meshed to create a finite element model. Fluid in the fuel tank is modeled with Lagrangian or arbitrary Lagrangian Eulerian finite elements, or smoothed particle hydrodynamics particles. Solid fluid interactions are added to the meshed solid model. A vehicle crash simulation is run on the solid model together with the fluid interactions to determine the effect of the fluid interactions on the interface of each strut rod with the flange and to determine any effect on the flange.

9 Claims, 3 Drawing Sheets

U.S. PATENT DOCUMENTS

| | | | |
|---|---|---|---|
| 2006/0050987 A1* | 3/2006 | Shimada et al. | 382/285 |
| 2006/0130926 A1 | 6/2006 | Riegel et al. | |
| 2007/0024620 A1* | 2/2007 | Muller-Fischer et al. | 345/427 |
| 2007/0038424 A1* | 2/2007 | Schirm et al. | 703/9 |

FOREIGN PATENT DOCUMENTS

| | | |
|---|---|---|
| DE | 19924207 A1 * | 11/2000 |

OTHER PUBLICATIONS

Cadwallader et al., "Safety issues with hydrogen as a liquid fuel", Idaho National Engineering and Environmenal Labrotary, 1999.*

Wieshe, SA., "Computational slosh dynamics: theory and Industrial Applications", Computational Mechanics, 2003.*

Wieshe, SA., "Noise due to sloshing in automotive fuel tanks", Springer verlog, 2005.*

Wikipedia, "Solid modeling", 2010.*

Hohler, W., "CAD/CAM Workshop: What is solid modeling?", 2000.*

Coquillart, S, "Extended free-form deformation: a sculpturing tool for 3D geometric modeling", Jun. 1990.*

Pasko et al., "Functional representation in geometric modeling: concepts, implementation and applications", 1995.*

Wesley et al., "A geometric modeling system for automated mechanical assembly", Jan. 1980.*

Casale et al., "Free-form solid modeling with trimmed surface patches", IEEE 1987.*

Hallquist, J. LS-DYNA Theoretical Manual. Livermore Software Technology Corporation, 1998.

Wu, W., Thomson, R. "A study of the interaction between a guardrail post and soil during quasi-static and dynamic loading". International Journal of Impact Engineering, article in press.

Rust, W., Schweizerhof, K. "Finite element limit load analysis of thin-walled structures by ANSYS (implicit), LS-DYNA (explicit) and in combination", Thin-Walled Structures 41 (2003) 227-244.

Hoermann, M. and others. "Horizontal Tailplane Subject to Impact Loading". 8$^{th}$ International LS-DYNA Users Conference.

Anghileri, M. and others. "Fluid-structure interaction of water filled tanks during the impact with the ground". International Journal of Impact Engineering 31 (2005) 235-254.

Fuel system: Fuel system integrity. USA/Federal: 49 CFR 571.301 (FMVSS 301) (Aug. 25, 2005).

Vesenjak M et al., "Computational modelling of fuel motion and its interaction with the reservoir structure", Journal of Mechanical Engineering vol. 52, No. 2, Feb. 1, 2006 pp. 85-100.

Meywerk M. et al., "Fluid-structure interaction in crash simulation", Institution of Mechanical Engineers. Proceedings, Part D: Journal of Automobile Engineering, vol. 214, No. 7, Jan. 1, 2000, pp. 669-673.

* cited by examiner

FLUID SOLID INTERACTION INCLUDED IN IMPACT SIMULATION OF FUEL DELIVERY MODULE

This application is based on U.S. Provisional Application No. 60/898,925 filed on Feb. 1, 2007, and claims the benefit thereof for priority purposes and is incorporated by reference into this specification.

FIELD OF THE INVENTION

The invention relates to a fuel delivery module for a vehicle and, more particularly, to finite element analysis (FEA) simulation thereof.

BACKGROUND OF THE INVENTION

Automotive crash testing is very expensive to carry out in terms of time and money. In this day and age, it is simply not practical to use a methodology of making an engineering estimate, mocking up a sample, testing, then modifying and retesting. Program timing and budgets would typically allow for one round of vehicle crash testing as a final validation. This being the case, simulation has found wide application in the development phase. With this, a virtual model is built, typically with commercially available codes and crash conditions simulated. The configuration can then be modified and optimized before physical prototypes are made.

One application of automotive crash simulation is in the development of fuel delivery modules. With reference to FIG. 1, a fuel delivery module (FDM), generally indicated at 11, is a device mounted into the fuel tank (not shown) of a vehicle which draws fuel up and delivers it to the engine at a pre-defined pressure. The portion of the FDM which engages the top of the fuel tank is a flange 10 made, in most cases, of plastic. This flange is sealed to the tank by an O-ring and held in place by a steel lock ring. The flange 10 is supported by struts 14 above a fuel pump 12 that is typically disposed in a reservoir (not shown). Hoses (not shown) are used to fluidly couple the fuel pump 12 to the flange 10 so that fuel may be delivered from the fuel pump through the flange.

There are several performance requirements of the FDM. One of these requirements, FMVSS 301, spells out specific crash tests and sets forth tolerable amounts of fuel which may spill. To meet this requirement, the FDM flange must not be breached. Internal damage is allowed, provided it does not allow fuel spillage. Another requirement of a specific FDM which is customer driven is that the FDM must remain fully functional, without damage, after a 10 mph vehicular impact. For the customer, 10 mph corresponds to the point at which the air bag is deployed. It is desired that if the air bag is not deployed due to a lower speed impact, the only damage to the vehicle would be visible to the outside, such as bumpers or panels. Requirements such as these have a major effect on what the FDM configuration will be.

To meet impact requirements, design engineers rely heavily on simulation to help point out strengths or weaknesses in their designs. Even though an engineer may have years of experience, it is difficult to predict what might happen in all instances without the use of simulation. This is due in part because the basic configuration is evolving. The concept of delivering fuel to the engine is mature. But, how this is done has been changing. Pressure regulation and filtering has been included with the fuel pump as a modular unit. This has resulted in cost savings and ease of assembly and servicing. Additionally, plastics are becoming favored over steel because of cost and weight savings. This all adds complexity that the engineer must consider when designing to meet crash requirements making simulation an even more important and useful tool.

Simulation of structural transients by FEA involves solving a second order equation:

$$[M]\{a\}+[C]\{v\}+[K]\{u\}=\{F\}$$

Where:
[M]=structural mass matrix
[C]=structural damping matrix
[K]=structural stiffness matrix
$\{a\}$=nodal acceleration vector
$\{v\}$=nodal velocity vector
$\{u\}$=nodal displacement vector
$\{F\}$=applied load vector Two methods of solving this equation include implicit time integration and explicit time integration. Both methods proceed through time in finite steps. The two methods are somewhat different in how they are performed and where they can be applied to obtain a solution in the most efficient manner.

Because the embodiment proposes use of the explicit method, details of the implicit method will not be discussed. However, several characteristics, advantages and disadvantages are given for comparison. The implicit method solves for displacements $\{u\}$ first and then calculates the remaining quantities. As such, inversion of the stiffness matrix [K] is required. This step is computationally expensive. If the simulation is non-linear, [K] will be a function of $\{u\}$ and an iterative technique such as Newton-Raphson is typically used. This can require many inversions of [K], greatly increasing the computational cost. An advantage of the implicit method is the fact that it is stable for large time steps. An excellent example of an application where this would be useful is in creep calculations.

The explicit method, like the Central Difference Method used in LS-DYNA (a finite element program of Livermore Software Technology Corp.), solves for accelerations first. Then other quantities are calculated. To do this, an internal force vector is created consisting of inertial forces [M]$\{a\}$, damping forces [C]$\{v\}$, and elastic forces [K]$\{u\}$. The internal force vector is combined with the external applied load vector and accelerations found using Newton's Second Law, F=Ma. Inversion of the mass matrix is required for solution. However, because the lumped mass approximation is used, the mass matrix is diagonal and inversion is trivial. The process is repeated as the solution is stepped through time. For stability, there is a maximum time step related to the speed of sound through the smallest element. This time step is usually quite small. For computational efficiency, a very regular mesh is desired. There is also a technique called mass scaling. This increases the density of the smallest elements in an attempt to achieve a larger time step. If there are very few small elements, a large increase in time step can be realized with a very small increase in mass. This can help keep required computer resources reasonable.

A major advantage of the explicit method is in the handling of non-linearities. Regardless of the non-linearites present, an internal force vector is created and accelerations are calculated effectively by matrix multiplication. The computational cost remains about the same. If the implicit method were used, non-linearities would typically be accounted for in the stiffness matrix. As it becomes more highly non-linear, many inversions may be required in an iterative process for convergence greatly increasing the computational cost.

Typical uses of the explicit method include short duration transient simulations and highly non-linear events, such as crash and impact analysis, simulating explosive events such as air bag deployment, etc.

The explicit method in LS-DYNA is currently used to evaluate fuel delivery modules under impact loadings. A conventional module mesh for a fuel delivery module 11 is shown in FIG. 2. There are two primary requirements that need to be met. First, the plastic flange 10 must not be breached under impact loading as per 49 CFR 571.301 (FMVSS 301). This behavior is considered to be of utmost importance for the vehicle safety: In case of a severe vehicle crash, everything inside the fuel tank is allowed to be rendered non-functional. However the tank vessel as a whole must remain sealed. Otherwise, fuel would be allowed to leave the tank causing a hazardous situation. To accomplish this sealing property, the module is configured in such a way as to separate in a prescribed location away from the upper surface. In FIG. 2, a strut boss 16 has a geometric stress raiser in that it is squared off and stepped in the location where separation is intended. Additionally, the strut rod 14 is press fit into the boss 16 almost to the step. The interference creates strain in the polymer adding pre-load to the intended separation area.

The second requirement to be met is that the module must be fully functional after a prescribed low speed impact. This means the strut boss 16 must not separate upon low speed impact and the strut rods must not take a permanent set from bending, among other things. It is noted that if the strut rod 14 is constructed with a stiffer geometry (thicker wall), or is made of a higher yielding steel, permanent deformation will be less likely, but more energy will be transferred to the strut boss 16 increasing the chance of separation.

As shown in FIG. 2, the conventional FEA model is constructed with a hexahedral mesh in the areas of concern which include the area off the strut boss 16, the flange 10 and strut rods 14. The bottom unit (including reservoir 18 and pump 12 therein) is constructed of shell elements and is treated as rigid. This means the displacements at each of the nodes are tied so there are only six degrees of freedom for the lower unit. This slims down the computational requirements. Spring elements 22 simulate the springs around the strut rods 14. The fuel tank environment 20 is constructed with a coarse shell mesh. The flange 10 of the module is tied to the tank environment 20. Loads can be applied to the tank environment from a previously run global analysis or can simply be prescribed. Contact within the model is penalty based meaning the following: as an element defined as contact passes through an element defined as target, a force is created which has a magnitude of element stiffness, multiplied by area, multiplied by the penetration distance, multiplied by a penalty value. The direction of the force is such that the contact element is pushed back away from the target element, preventing penetration as a consequence.

Several material models are used within the conventional simulation. For the polymer, an isotropic hardening plasticity model is used. This model works well with geometric non-linearities such as large deflection, but since the Bauschinger effect is not included, is not as useful for cyclic loading. The steel strut rod uses an elastic material model and the bottom unit uses a rigid material model. Stiffness is still assigned to the rigid model even though the model doesn't deform. This is so the contact forces can be correctly assessed.

The conventional simulation correctly predicts where strain buildup will occur in the polymer flange and therefore where fracture would be expected. However, separation takes place as the strut rod slides out of its press fit. In testing, separation occurs as a fracture. Also, at what impact magnitude separation occurs is not well predicted. Additionally, permanent deformation of the strut rod is not predicted because an elastic material model is currently in use.

Thus, there is a need to provide a simulation for a fuel delivery module that will correctly address the above deficiencies of the conventional simulation.

SUMMARY OF THE INVENTION

An object of the present invention is to fulfill the need referred to above. In accordance with the principles of the present invention, this objective is obtained by providing a method of simulating a vehicle crash on a fuel delivery module of a vehicle. The fuel delivery module has a flange constructed and arranged to be coupled to a fuel tank, a fuel pump for delivering fuel from the tank and through the flange, a reservoir housing the fuel pump, and strut rods. Each strut rod has an end coupled to the reservoir or fuel pump and another end coupled to the flange at an interface. The method models a fuel tank associated with the fuel delivery module as a rigid or elastic shell. A solid model of the fuel delivery module is created. Meshing is added to the solid model. A model of the fluid is created and discretized. Solid fluid interactions are added to the meshed solid model. A vehicle crash simulation is run on the solid model together with the fluid interactions to determine the effect of the fluid interactions on the interface of each strut rod with the flange and to determine any effect on the flange.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

There are several ways in which the conventional simulation of a fuel delivery module 11 described above can be improved and optimized. Thus, the embodiment employs the conventional simulation as described in the Background section together with the following improvements.

Figure 1:
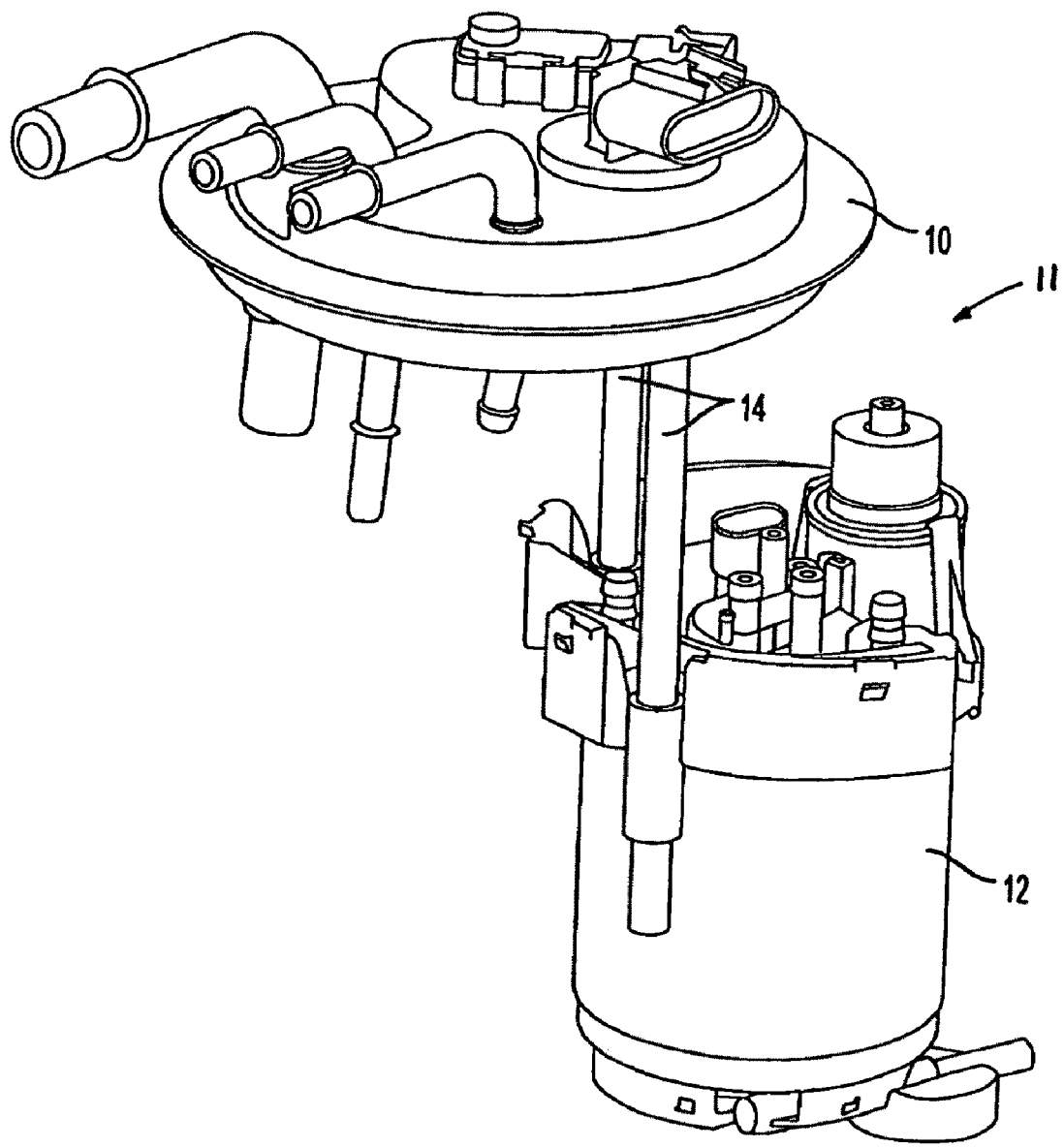
FIG. 1 is view of a conventional fuel delivery module for a vehicle shown without a reservoir that houses the fuel pump.
Figure 2:
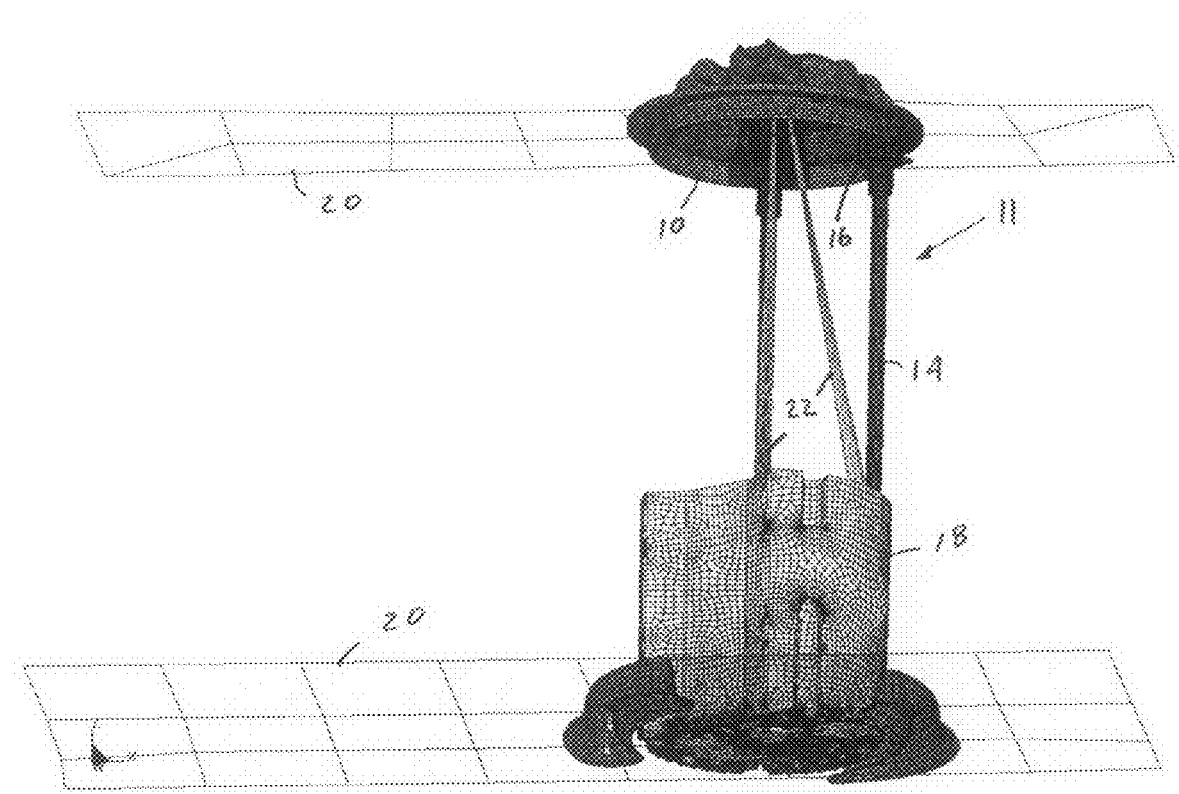
FIG. 2 is a view of a conventional model mesh of a fuel delivery module.
Figure 3:
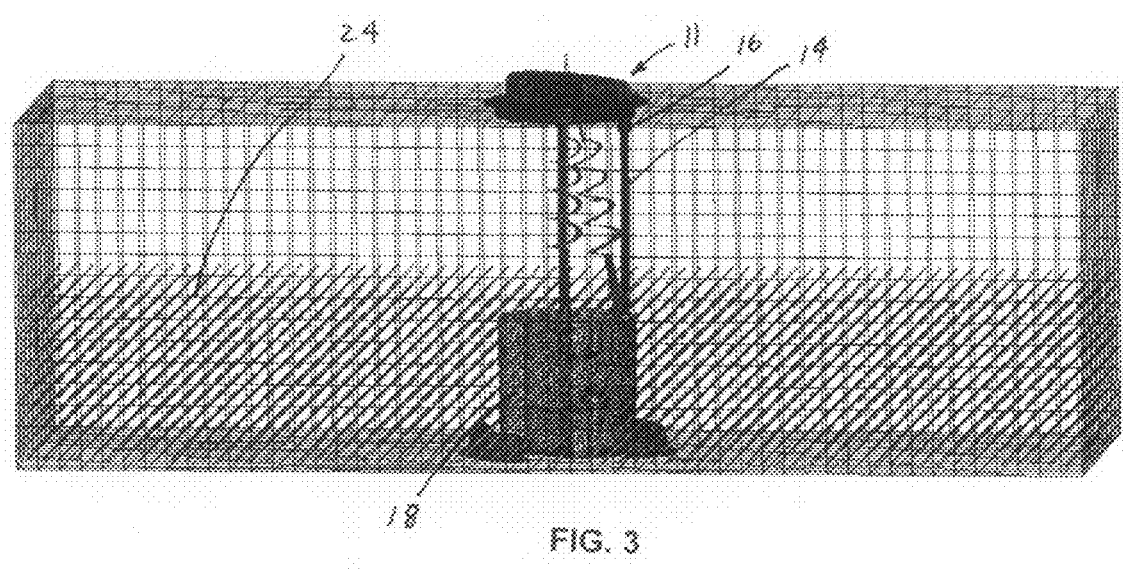
FIG. 3 is a view of a model mesh of a fuel delivery module provided in accordance with the principles of an embodiment of the invention.

The first way to improve the conventional simulation is to include solid fluid interactions. This interaction can have several significant effects. First, with reference to FIG. 3, if the reservoir 18 (the fuel pump 12 in the reservoir cannot be seen in FIG. 3, but is shown in FIG. 2) is filled with fuel (fluid) due to fuel being in the fuel tank, the total mass is larger. If deceleration is applied in the horizontal direction, for example, greater forces will be experienced in the strut-boss area. Second, fluid external to the reservoir 18 can transfer momentum to it changing forces seen at the strut boss, or by the strut rods further.

As another optimization or improvement, plasticity is preferably included in the strut material model. This adds the ability to predict permanent deformation of the strut rod which is not done in the conventional simulation. Thus, both plastic and elastic response of the material is considered in the model of the embodiment. In the conventional simulation, a simple elastic model was used. Steel can exhibit strain rate dependency. As such, strain rate effects should be added to the material model which shifts the yield.

Regarding the plasticity model used for the polymer flange 10, strain rate effects are currently not included. It is well known that most polymers behave differently when loaded at different rates. At high strain rates, polymers tend to have a higher yield and fracture at lower strain magnitudes. This strain rate dependence is added to the plasticity model of the embodiment. Also, temperature can have a large effect on the stress-strain curve. Thus, temperature is considered also, preferably as separate runs at different temperatures. Lastly, LS-DYNA has criterion built into some of the material models whereby elements can be "turned off" when some strain value is met. Previously, strains were plotted and visually examined for levels which would result in fracture. Also, within the simulation, the strut rod would separate by slipping out of the strut boss. In testing, one observes a fracture instead of a separation. The criterion built into the model of the embodiment shows separation correctly as fracture.

With the above in mind and in accordance with the principles of an embodiment of the invention, first, a solid model for a fuel delivery module of interest is built. Then, the model is meshed with high quality hexahedral meshes for solids and quadrilaterals for shells. Degenerate tetrahedrons may be acceptable in areas of low strain. The reservoir 18 and fuel pump 12 (and any other components internal to the reservoir 18) are constructed of shell elements and are treated as rigid. This means the displacements at each of the nodes are tied so there are only six degrees of freedom for the lower unit. This slims down the computational requirements.

Solid fluid interactions 24 are added to the model. There interactions are practical indications that a sloshing wave in the closed tank, caused by a crash deceleration, may transfer a comparable momentum to the fuel delivery module as do the primary mass-inertia forces. The quantitative importance of this effect needs to be examined. There are several possible ways to do this. The first and easiest is to model the fluid as a Lagranian elastic fluid, using for example, the LS-DYNA model *mat_elastic_fluid. This model has density and bulk modulus but zero shear modulus. In this formulation, both meshes (fuel module and fluid) are deformable. Contact is then be defined between the fluid elements and solid elements. Momentum is then transferred between the fluid and structure. Problems can arise with this formulation when the fluid mesh 24 gets substantially deformed. Severe distortion in the mesh 24 is expected, for example, when fluid sloshes out of the reservoir 18. This could cause the calculation to break down and this solution is thus not preferred.

A second solution is to use an arbitrary Lagrangian Eulerian (ALE) element formulation for the fluid. Here, the mesh 24 is allowed to deform during each time step. But, an advection step follows each step allowing mass to transfer across the fluid element boundaries thereby reducing distortion. The pure Lagrange formulation is retained for the solid module mesh. This results in a more accurate solid fluid interaction. However, it was found this is much more computationally expensive. This being the case, it is necessary to keep geometry as simple as possible while still retaining the key features.

Both of the above-mentioned solutions do not consider pressure from vapors or air in a closed vessel. It is postulated that this pressure would be minimal compared to the other effects considered. Therefore, the space above the fluid is treated as empty. Also, the tank is considered as a rigid shell.

A preferred solution for modeling the fluid is smoothed particle hydrodynamics (SPH) which is a mesh free particle technique that was originated in 1977. Herein, the SPH method is described as a Lagrangian method in which the physical bodies are discretized with particles. These particles move by external forces and internal interactions in the problem domain as the physical body would. Each particle has mass as determined by the discretization and no mass is transferred between particles. Numeric discretization is performed on the governing equations using a concept called the particle approximation. The functions, derivatives, and integrals in the governing equations are represented at each particle in such a way that neighboring particles have an influence. The range of this influence is denoted the smoothing length.

The approach of using SPH for simulation precedes which a philosophy similar to other numeric methods. A mathematical model, established from physical phenomena consisting of ODEs, PDEs, etc., is created from the physical phenomena desired to study in a way similar to other numerical methods. Next, the domain is discretized with SPH particles. The mathematical model is then discretized using the particle approximation and the resulting equations solved.

Domain discretization for SPH is somewhat different than for grid based methods. Particles are generated which have discrete masses. There is no connectivity defined between the particles in the domain discretization. This is later accomplished in the numerical discretization. It is this fact that gives the SPH method many of its advantages. Because there is no particle connectivity, extreme distortions can be well tolerated. This is in contrast to Lagrangian finite element formulations where large element distortions would cause some loss of solution accuracy, or, in extreme cases, complete breakdown of the calculation. An additional advantage is that there is no advection between the particles. Field variables are evaluated at the particles. This allows for a more efficient calculation and easy following of free surfaces. Particles can be arbitrarily distributed as it is not required that each particle be the same mass. In practice, particles can be generated by creating a finite element mesh by traditional means. Then, particles can be placed either at the mass centers of the elements, at the nodes, or both. The finite element mesh is then deleted leaving a particle distribution.

To achieve numeric quantization, two steps are performed. First the kernel approximation of the field functions is constructed. In this step, the field functions and derivatives are replaced by integral representations. This formulation is necessary for stability. The particle approximation is then created by applying a smoothing function and converting the integrals into sums over particles within the support domain. The support domain of a particle consists of all particles neighboring which have influence. Following creation of the particle approximation, the resulting equations are solved by explicit time integration.

After the models are complete, a vehicle crash simulation should be run at various conditions and compared to previous testing to validate new models.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A method of simulating a vehicle crash on a fuel delivery module of a vehicle, the fuel delivery module having a flange constructed and arranged to be coupled to a fuel tank, a fuel pump for delivering fuel from the tank and through the flange, a reservoir housing the fuel pump, and strut rods, each having one end coupled to the reservoir or fuel pump and another end coupled to the flange at an interface, the method comprising:
   modeling a fuel tank associated with the fuel delivery module as a rigid or elastic shell,
   creating a solid model of the fuel delivery module,
   meshing the solid model,
   adding solid fluid interactions to the meshed solid model by modeling the fluid and discretizing, and
   running a vehicle crash simulation on the solid model together with the fluid interactions to determine the effect of the fluid interactions on the interface of each strut rod with the flange and to determine any effect on the flange.

2. The method of claim 1, wherein the creating step includes modeling the material of the flange as a polymer and modeling the material of the strut rods as steel.

3. The method of claim 2, wherein the creating step includes including plasticity and elasticity in a model of the strut rod material.

4. The method of claim 2, wherein the creating step includes strain rate effects in the modeling the polymer flange and steel strut.

5. The method of claim 1, wherein the running step includes running the simulation at different operating temperatures.

6. The method of claim 1, wherein the meshing step includes using hexahedral meshes for solid objects and quadrilateral meshes for shell objects.

7. The method of claim 1, wherein the adding step includes modeling the fluid as a Lagranian finite element mesh.

8. The method of claim 1, wherein the adding step includes modeling the fluid as an arbitrary Lagrangian Eulerian finite element mesh.

9. The method of claim 1, wherein the adding step includes modeling the fluid using a smoothed particle hydrodynamics method.

* * * * *